United States Patent
Feuchtwanger et al.

(10) Patent No.: US 9,597,686 B1
(45) Date of Patent: Mar. 21, 2017

(54) SERVICEABLE MICROGRAVITY FLUID-HANDLING SYSTEM

(71) Applicant: Spacepharma SA, Delémont (CH)

(72) Inventors: Yair Feuchtwanger, Yokneam-Ilit (IL); Molly K. Mulligan, Tel Aviv (IL); Ira Naot, Zichron Yaacov (IL); Alexander Pekin, Ramat-Gan (IL)

(73) Assignee: SPACEPHARMA SA, Delémont (CH)

( * ) Notice: Subject to any disclaimer, the term of this patent is extended or adjusted under 35 U.S.C. 154(b) by 0 days.

(21) Appl. No.: 14/840,082

(22) Filed: Aug. 31, 2015

(51) Int. Cl.
| | |
|---|---|
| *B01D 35/00* | (2006.01) |
| *B01D 35/157* | (2006.01) |
| *F16K 21/00* | (2006.01) |
| *B01L 3/00* | (2006.01) |
| *B01D 15/10* | (2006.01) |
| *B01D 15/26* | (2006.01) |
| *G01N 33/00* | (2006.01) |

(52) U.S. Cl.
CPC ..... *B01L 3/502738* (2013.01); *B01L 3/50273* (2013.01); *B01L 3/502715* (2013.01); *B01L 3/52* (2013.01); *B01L 3/567* (2013.01); *B01L 2200/0621* (2013.01); *B01L 2300/087* (2013.01); *B01L 2300/0877* (2013.01); *B01L 2400/0406* (2013.01); *B01L 2400/0611* (2013.01); *B01L 2400/0622* (2013.01)

(58) Field of Classification Search
CPC .......... B01L 3/502738; B01L 3/50273; B01L 3/502715; B01L 3/52; B01L 3/567; B01L 2300/087; B01L 2400/04006; B01L 2400/0622

See application file for complete search history.

(56) References Cited

U.S. PATENT DOCUMENTS

| | | | |
|---|---|---|---|
| 2003/0019812 A1* | 1/2003 | Berger | B01D 11/0203 210/656 |
| 2007/0068573 A1* | 3/2007 | Cox | G01N 27/44769 137/1 |
| 2008/0032380 A1 | 2/2008 | Kleis et al. | |

FOREIGN PATENT DOCUMENTS

EP 2423679 2/2012

OTHER PUBLICATIONS

Internationl Search Report for PCT Application No. PCT/IL2016/050945 dated Dec. 4, 2016.

\* cited by examiner

*Primary Examiner* — Jennifer Wecker
(74) *Attorney, Agent, or Firm* — Pearl Cohen Zedek Latzer Baratz LLP

(57) ABSTRACT

A serviceable system for handling fluids in microgravity includes supply reservoirs to hold a supply fluid for a process, a fluid processing unit to perform the process and a collection reservoir to collect a fluid from the fluid processing unit. Each supply reservoirs is provided with a supply valve assembly of valves and conduits, and at least one external conduit that is connectable to an external fluid source or to an external suction source. The supply valve assembly is configured to enable individually: flow of the supply fluid from the supply reservoir to the fluid processing unit, flow of a fluid into the supply reservoir from the external conduit; withdrawal of fluid from supply reservoir to the external conduit, and flow of fluid from the external conduit to the fluid processing unit.

20 Claims, 9 Drawing Sheets

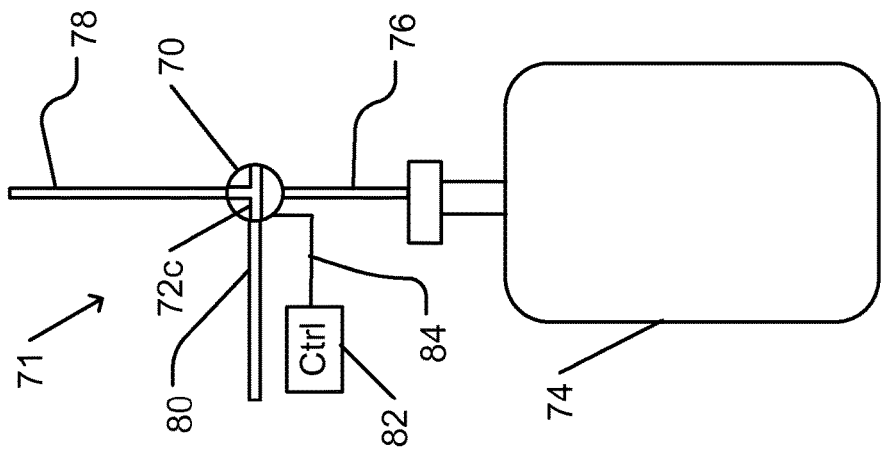
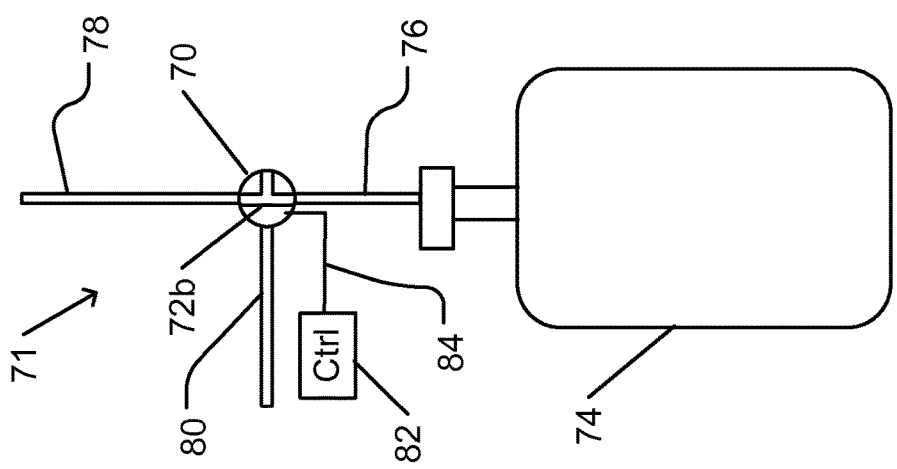
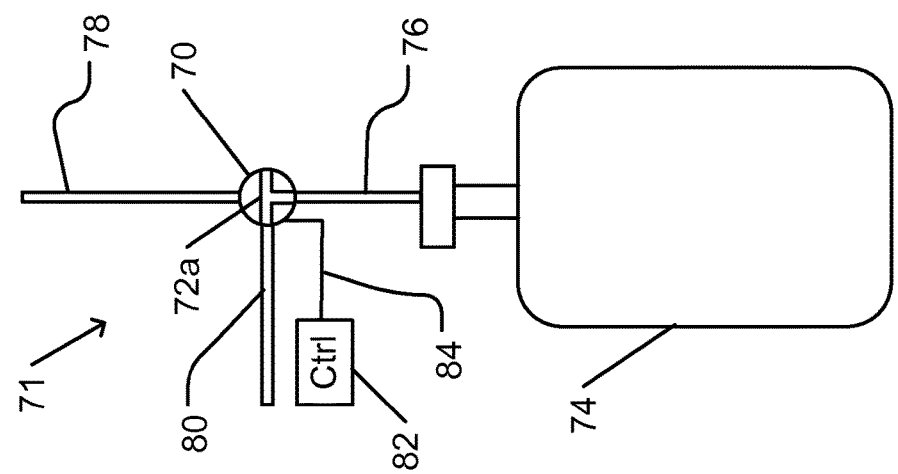

SERVICEABLE MICROGRAVITY FLUID-HANDLING SYSTEM

FIELD OF THE INVENTION

The present invention relates to microgravity systems. More particularly, the present invention relates to a serviceable microgravity fluid-handling system.

BACKGROUND OF THE INVENTION

When liquids are being handled in a terrestrial laboratory, the force of gravity generally causes the liquids to accumulate at the bottom of a container. Gasses such as air, being generally less dense than the liquids, tend to rise to the top of the container. Thus, for example, containers or other components of a fluid-handling system may be designed to take advantage of these effects. For example, structures to vent air bubbles or generated gasses may be placed at the top of the container.

Also, in a terrestrial setting, it may be expected that components of a fluid-handling system will be accessible for cleaning or other servicing or maintenance. Thus, when a component of the system requires maintenance, the component could be removed from the system for handling.

In some cases, effects of gravity in a terrestrial laboratory may interfere with the experiment or other process that are being performed in the laboratory or being developed. In such cases, a system may be placed in microgravity environment. When a system is in a microgravity environment, all components of the system are subject to identical or indistinguishable gravitational forces. For example, the system may be in free fall or in orbit about a massive body. In the microgravity environment, gravitational contact forces between two components of the system, or weight, may be absent or negligible.

A microgravity environment may include a drop tower or similar facility, producing a few seconds of microgravity. Up to about half a minute of continuous microgravity may be provided by an aircraft that is flying in an appropriate pattern (e.g., parabolic arcs). A manned or unmanned spacecraft in earth orbit or deeper space may enable long (e.g., days or longer, and in some cases, unlimited) time in microgravity.

In some cases, a system for performing the process in microgravity may utilize lab-on-a-chip technology or other micro-technology. Use of such technology may enable incorporation of the microgravity system in a platform where available space may be very limited or expensive.

Some such processes require use of liquid materials. A process may require transfer of a liquid from a reservoir to another part of the system, e.g., where the liquid interacts with another component. A process may require transfer of a liquid from the system to a reservoir where the liquid is stored for later use, study, or recovery, or where a waste liquid is stored for later disposal. Typically, a flexible liquid reservoir, e.g., in the form of a bag or pouch, enables storage of liquids in a manner that prevents escape of the liquid, conserves space, and enables transfer of the liquid without trapping air or gases which could lead to formation of bubbles.

Due to the weightlessness in the microgravity environment, liquids do not accumulate at the bottom of a container but may float freely within a container or conduit. A fluid-handling system for microgravity must be able to operate under such weightless conditions.

SUMMARY OF THE INVENTION

There is thus provided, in accordance with an embodiment of the present invention, a serviceable system for handling fluids in microgravity, the system including: one or a plurality of supply reservoirs, each of the one or a plurality of supply reservoirs to hold a supply fluid for a process; a fluid processing unit to perform the process; a collection reservoir to collect a fluid from the fluid processing unit; for each of the one or a plurality of supply reservoirs: a supply valve assembly of one or a plurality of valves and conduits; and at least one external conduit, at least one conduit of the at least one external conduit being connectable to an external fluid source, and at least one conduit of the at least one external conduit being connectable to an external suction source, wherein the supply valve assembly is configured to enable individually: flow of the supply fluid from that supply reservoir to the fluid processing unit, flow of a fluid into that supply reservoir from a conduit of the at least one external conduit; withdrawal of fluid from that supply reservoir to a conduit of the at least one external conduit, and flow of fluid from a conduit of the at least one external conduit to the fluid processing unit.

Furthermore, in accordance with an embodiment of the present invention, the one or a plurality of valves includes a first, second and third check valve, and wherein the at least one external conduit includes: a filling conduit that is connectable to the external fluid source, the filling conduit connected to the that supply reservoir via the first check valve, the first check valve configured to enable fluid flow from the filling conduit to the that supply reservoir; and a flushing conduit that is connectable to the external suction source, the flushing conduit being connected to the that supply reservoir via the second check valve, the second check valve configured to enable the external suction source to cause a flow of fluid from the that supply reservoir to the flushing conduit, the flushing unit being further connectable to an external source of a flushing fluid, the third check valve being configured to enable flow of the flushing fluid from the flushing conduit to the fluid processing unit.

Furthermore, in accordance with an embodiment of the present invention, the first and second valves include a combination valve that is configured to enable the flow from the filling conduit to the that supply reservoir and to enable the flow from the that supply reservoir to the fluid processing unit while concurrently blocking flow from the that supply reservoir to the filling conduit.

Furthermore, in accordance with an embodiment of the present invention, the first, second or third check valve includes a duckbill valve.

Furthermore, in accordance with an embodiment of the present invention, the one or a plurality of valves includes an externally controllable valve, and wherein the at least one external conduit includes one external conduit that is connectable to the external fluid source or to the external suction source.

Furthermore, in accordance with an embodiment of the present invention, the externally controllable valve includes a three-way valve, the three-way valve controllable to connect any two of the external conduit, the that supply reservoir and the fluid processing unit.

Furthermore, in accordance with an embodiment of the present invention, the system includes a controller to control operation of the externally controllable valve.

Furthermore, in accordance with an embodiment of the present invention, the collection reservoir is provided with a collection valve assembly and a drainage conduit, the collection valve assembly configured to enable a flow of a fluid from the fluid processing unit to the collection reservoir, and a fluid flow between the collection reservoir and the drainage conduit.

Furthermore, in accordance with an embodiment of the present invention, the collection valve assembly includes a check valve configured to enable fluid flow from the fluid processing unit to the collection reservoir.

Furthermore, in accordance with an embodiment of the present invention, the system includes a pump to cause the supply fluid to flow from the one or a plurality of supply reservoirs to the fluid processing unit.

Furthermore, in accordance with an embodiment of the present invention, the system includes a conduit closing unit to enable opening or closing one or more of the at least one external conduit.

Furthermore, in accordance with an embodiment of the present invention, the fluid processing unit includes a microfluidic chip.

There is further provided, in accordance with an embodiment of the present invention, a method for operating a serviceable system for handling fluids in microgravity, the system including one or a plurality of supply reservoirs, a fluid processing unit, a collection reservoir, and at least one external conduit, the method including for each of the one or a plurality of supply reservoirs: operating a valve assembly of that supply reservoir so as to individually enable fluid to flow between a conduit of the at least one external conduit and that supply reservoir, between that supply reservoir and the fluid processing unit, or between a conduit of the at least one external conduit and the fluid processing unit.

Furthermore, in accordance with an embodiment of the present invention, the method includes operating a pump to cause fluid to flow from that supply reservoir to the fluid processing unit.

Furthermore, in accordance with an embodiment of the present invention, the method includes operating a collection valve assembly of the collection reservoir to enable fluid to flow from the fluid processing unit to the collection reservoir or to enable fluid to flow from the collection reservoir to an external drainage conduit.

Furthermore, in accordance with an embodiment of the present invention, the valve assembly includes a static valve assembly, and wherein operating the valve assembly includes operating a pump, introducing fluid into the at least one external conduit or applying suction the at least one external conduit.

Furthermore, in accordance with an embodiment of the present invention, the at least one external conduit includes a filling conduit and a flushing conduit, and wherein operating the valve assembly includes one of individually: operating a pump to cause fluid to flow from the that supply reservoir to the fluid processing unit; introducing fluid into the filling conduit to fill the that supply reservoir; applying suction to the flushing conduit to remove a fluid from the that supply reservoir; and introducing a flushing fluid into the flushing conduit to cause the flushing fluid to flow from the flushing conduit to the fluid processing unit.

Furthermore, in accordance with an embodiment of the present invention, the valve assembly includes an externally operable valve, and wherein operating the valve assembly includes operating a controller to operate the externally operable valve.

Furthermore, in accordance with an embodiment of the present invention, the externally operable valve includes a three-way valve and the at least one external conduit includes a single external conduit, the three-way valve being operable to individually connect one of: the single external conduit with the that supply reservoir, the that supply reservoir with the fluid processing unit, or the single external conduit with the fluid processing unit.

Furthermore, in accordance with an embodiment of the present invention, the method includes: when the three-way valve connects the that supply reservoir with the fluid processing unit, operating a pump to cause fluid to flow from the that supply reservoir to the fluid processing unit; when the three-way valve connects the single external conduit with the that supply reservoir, introducing fluid into the single external conduit to fill the that supply reservoir; when the three-way valve connects the single external conduit with the that supply reservoir, applying suction to the single external conduit to remove a fluid from the that supply reservoir; or when the three-way valve connects the single external conduit with the fluid processing unit, introducing a flushing fluid into the single external conduit to cause the flushing fluid to flow from the single external conduit to the fluid processing unit.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 6A schematically illustrates an externally controllable valve assembly of a serviceable microgravity fluid-handing system in a configuration that connects a fluid reservoir to an external conduit, in accordance with an embodiment of the present invention.

FIG. 6B schematically illustrates the externally controllable valve assembly of FIG. 6A in a configuration that connects the fluid reservoir to another component of the serviceable microgravity fluid-handing system.

FIG. 6C schematically illustrates the externally controllable valve assembly of FIG. 6A in a configuration that connects a component of the serviceable microgravity fluid-handing system to an external conduit.

DETAILED DESCRIPTION OF THE INVENTION

Figure 1:
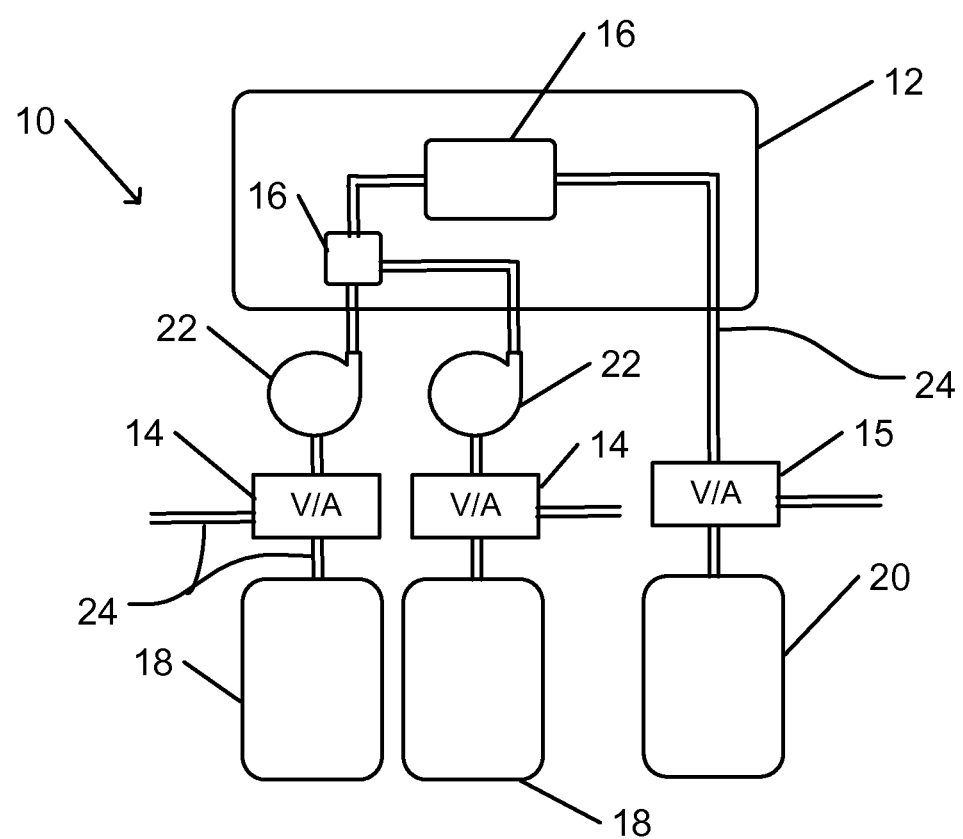
FIG. 1 schematically illustrates a serviceable microgravity fluid-handling system in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a valve assembly is configured to enable servicing of a fluid-handling system in a microgravity environment. The fluid-handling system is configured to deliver one or more liquids, e.g., liquid reagents, from one or more liquid reservoirs (e.g., in the form of flexible bags) to an apparatus that performs a process using the liquids, and to remove from the apparatus one or more liquids that are produced during operation of the process (e.g., a waste or collected fluid), or a liquid on which the process has already been performed.

As used herein, a process refers to any operation that is performed on a flowing liquid. For example, the process may include an experiment in which a liquid is subjected to analysis, examination, or inspection without altering the liquid. In this case, after having been subjected to the experiment, the unaltered liquid may be collected, e.g., for later use, for storage, for further analysis, for disposal, or for another purpose. A process may include an experiment, industrial or manufacturing process, or other type of process in which a single liquid is subjected to an agent (e.g., applied energy or force) that alters the liquid. The altered liquid may be collected, e.g., for further analysis, for use, for disposal, for storage, or for another purpose. A process may include mixing two or more liquids with one another to form (e.g., to remain as a mixture or to be subject to a chemical or other reaction to chemically alter the mixture). A liquid that is produced by this process may be collected, e.g., for analysis, for use, for disposal, for storage, or for another purpose.

For example, the apparatus may include a microfluidics chip. A microgravity environment may not enable access to the fluid-handling system. For example, the typical small size of a serviceable microgravity fluid-handling system may complicate disassembly, reassembly, and handling of components of the serviceable microgravity fluid-handling system. The serviceable microgravity fluid-handling system may be embedded within a package (e.g., satellite or rocket payload) that complicates access to the serviceable microgravity fluid-handling system. In some cases, the remoteness of the serviceable microgravity fluid-handling system (e.g., on a satellite in earth orbit) may complicate access to the serviceable microgravity fluid-handling system.

The valve assembly is configured to direct the flow of fluid through the system to individually enable one or more operations. The operations may include operation of the process in the apparatus, such as delivery of a liquid from a liquid reservoir to the apparatus, removal of a collected fluid from the apparatus to a liquid reservoir or filling a liquid reservoir with a reagent, flushing one or more components of the fluid-handling system to remove traces of previous contents, removing air or gas bubbles from the fluid-handling system, or other operations. As used herein, the term "individual" or "individually" is applied to list of operations when the listed operations are to be performed one at a time, and not concurrently with another of the listed operations.

In accordance with an embodiment of the present invention, a valve assembly for a serviceable microgravity fluid-handling system may include a static arrangement of conduits and check valves. As used herein, a static arrangement of valves refers to valves that are not externally operated to change a state (e.g., to be opened, closed, or to divert a flow of a liquid). Operation of the valve is determined only by the flow of fluid through the valve. A check valve enables flow of a fluid through the check valve in a forward direction only. Flow in the opposite backward direction is checked or inhibited.

For example, a check valve may include a duckbill valve, which includes a flexible (e.g., made of elastomer) tapering (duckbill shaped) extension with a slit at the end. A forward flow through the duckbill valve through the extension and toward the taper and the slit may force the slit open, enabling continued forward flow. When a backward flow attempts to enter the valve via the slit, the flow may close the taper and the slit, thus blocking the backward flow.

Alternatively or in addition, a check valve may include a moveable seal in the form of one or more balls, flaps, diaphragms, lid, or other moveable structure that is placed on or near an opening. When fluid flows through the check valve in the forward direction, the flow moves the moveable seal away from the opening, thus opening the seal and enabling continued forward flow of the fluid through the check valve. When fluid flows through the opening in the backward direction, the flow pushes the moveable seal onto the opening, thus closing the opening and preventing flow of the fluid through the check valve.

The check valves and conduits of a static arrangement of valves are arranged such that various functions of the valve assembly are individually performed in response to externally applied pressure or suction forces. The externally applied pressure or suction forces may be selectively applied by selective operation of one or more pumps of the fluid-handling system. One or more conduits of the system may be closed by an external valve or by pinching a conduit in the form of a tube with flexible walls.

For example, a static valve assembly may be configured for connection to a liquid reservoir that is configured to hold a liquid that is to be used in a process (e.g., liquid reagent), and to an apparatus where the process takes place. In this case, the static valve assembly may be configured to individually enable such operations as filling the liquid reservoir with the liquid (e.g., the reagent), removal of air bubbles from the reservoir or conduit, flushing an apparatus (or other components) of the system, and transferring liquid from the liquid reservoir to the apparatus (e.g., for use in the process).

As another example, a static valve assembly may be configured for connection to a collection reservoir that is configured to collect and hold a collected fluid (e.g., a waste liquid, a process product, or another fluid), and to the apparatus where the process takes place. In this case, the static valve assembly may be configured to enable such operations as collection of the collected fluid by the liquid reservoir from the apparatus, and draining of the collection reservoir to an external storage or analysis facility.

A static valve assembly for a serviceable microgravity fluid-handling system with check valves, in accordance with an embodiment of the present invention, may be advantageous over other types of valve assemblies. Since the check valves are static, no arrangement need be made for access to the valves. For example, the check valves do not require a connection, e.g., no electric, mechanical, hydraulic, or other, to a controller device in order to enable operation of the check valves. Thus, placement of the check valves within the valve assembly may be determined in accordance with operational considerations only. As a result, the flow path may be minimized as well as the overall volume of the valve assembly. Dead volume within the valve assembly may thus be minimized. A static valve assembly may be compact and self-contained, enabling inclusion in a payload where payload size is limited by volume or weight considerations. Since the check valves are static, testing of the valve assembly may be simplified (e.g., no need to test responses of valves to various types and combinations of commands).

In accordance with an embodiment of the present invention, a valve assembly for a serviceable microgravity fluid-handling system may be externally operable. In this case, a configuration of some or all valves of the valve assembly may be controllable from a controller that is located externally to the serviceable microgravity fluid-handling system. In some cases, the valve assembly may be disconnected from the external controller prior to placement in the microgravity environment (e.g., launch of a spacecraft or takeoff of an aircraft). For example, the valve assembly may be placed in an operational configuration for the duration that the serviceable microgravity fluid-handling system is in the microgravity environment. Various maintenance tasks that require other valve assembly configurations may be performed while the serviceable microgravity fluid-handling system is in a terrestrial environment (e.g., laboratory or other facility).

For example, an externally controllable valve assembly may include an arrangement of conduits and three-way valves. Each three-way valve is controllable to one of three states. For example, each three-way valve may be connected to three or more conduits. In each state of the three-way valve, two of the connected conduits are connected to one another, such that a fluid may flow from one of the connected conduits to the other. Each three-way valve may be controlled by a controller that is configured to coordinate among the states of the three-way valves of the assembly in order to direct a flow of a liquid in accordance with an operation being performed.

Alternatively or in addition, the externally controllable valve assembly may include one or more valves having fewer than, or more than, three states. It may be noted that attaining the functionality of a three-way valve with a two-way valve typically requires at least one additional valve.

FIG. 1 schematically illustrates a serviceable microgravity fluid-handling system that incorporates a valve assembly in accordance with an embodiment of the present invention.

Fluid-handling system 10 is configured to operate in a microgravity environment. Fluid-handling system 10 includes some or all of one or more supply fluid reservoirs 18, supply valve assemblies (V/A) 14, pumps 22, fluid processing units 12 (for example, a microfluidic chip or another component or location at which a process occurs that includes one or more fluids as reagents, products, or both), fluid collection reservoirs 20, collection valve assemblies 15, conduits 24, and any other relevant components. Fluid-handling system 10 may include one or more controllers (not shown). The controllers may be manually or automatically operated to control one or more of pump 22, an externally controllable valve of supply valve assembly 14 or of collection valve assembly 14, or one or more other components of fluid-handling system 10

Fluid-handling system 10 is configured to transfer a supply fluid (e.g., a reagent, a cleaning fluid, or another fluid) from one or more supply fluid reservoirs 18 to fluid processing unit 12. For example, fluid processing unit 12 may include one or more cells 16 in which various steps of the process occur.

Each pump 22 is configured to impel a fluid to move in a general direction from a supply fluid reservoir 18 (or from a conduit 24 that is upstream of that pump 22) toward fluid processing unit 12. Each pump 22 may be operated by a controller (not shown).

Each supply valve assembly 14 is configured to direct a flow of a fluid through one or more conduits 24 that are connected to supply valve assembly 14. Conduits 24 may include internal conduits that connect components of fluid-handling system 10, or may include external conduits that connect fluid-handling system 10 to an external fluid source or to an external suction source.

Fluid-handling system 10 may also be configured to transfer a collected fluid from fluid processing unit 12 to one or more fluid collection reservoirs 20. Each collection valve assembly 15 is configured to direct a flow of a fluid to one or more conduits 24 that are connected to collection valve assembly 15.

A method of operation of fluid-handling system 10 may include operating each supply valve assembly 14 to individually enable a fluid flow for performing a process in fluid processing unit 12, or for servicing one or more components of fluid-handling system 10. Operation of a supply valve assembly 14 may include individually introducing a (e.g., pressurized) fluid into one or more external conduits of fluid-handling system 10, applying suction to one or more external conduits of fluid-handling system 10, operating a pump 22 of fluid-handling system 10, or operating an externally controllable valve of a supply valve assembly 14. Operation of a collection valve assembly 15 may be similar to operation of a supply valve assembly 14.

In accordance with an embodiment of the present invention, each supply valve assembly 14 and each collection valve assembly 15 of fluid-handling system 10 may include a static valve assembly.

Figure 2A:
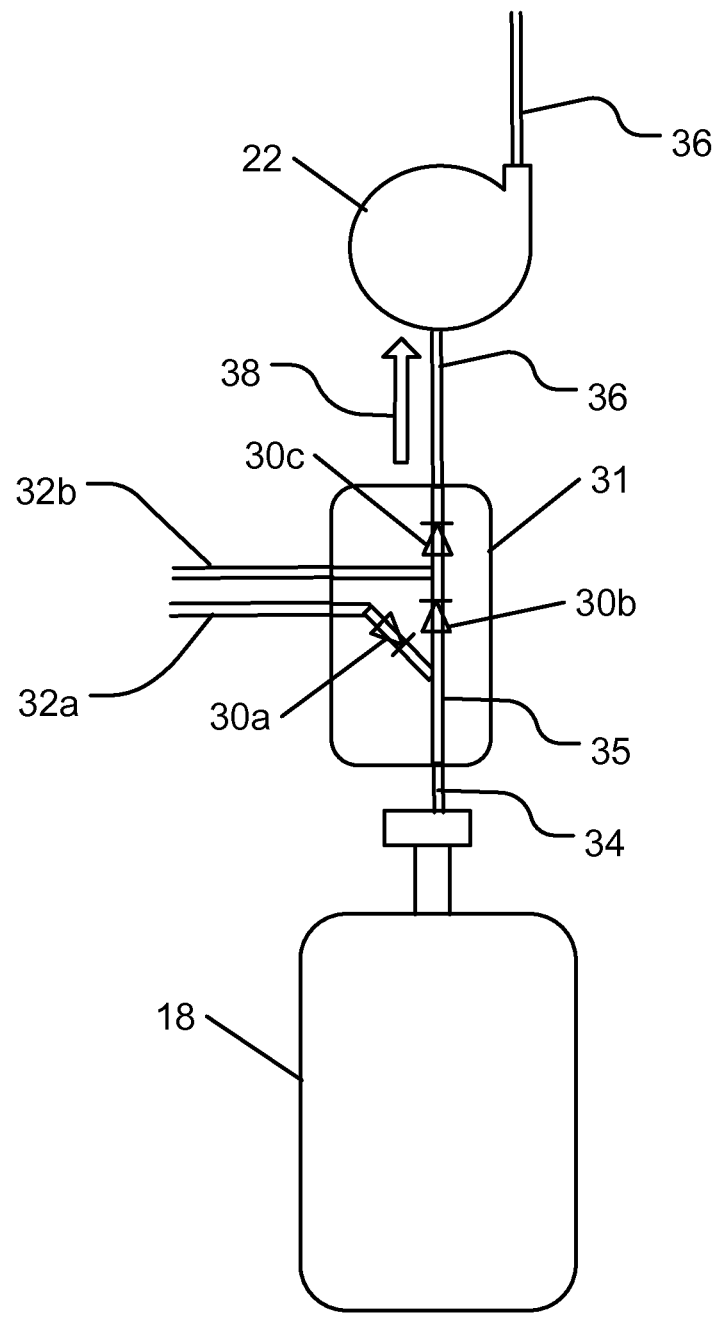
FIG. 2A schematically illustrates a configuration of a static valve assembly for connection to a supply fluid reservoir of a serviceable microgravity fluid-handing system, in accordance with an embodiment of the present invention.

FIG. 2A schematically illustrates a configuration of a static valve assembly for connection to a supply fluid reservoir of a serviceable microgravity fluid-handing system, in accordance with an embodiment of the present invention.

Supply static valve assembly 31 is connected between supply fluid reservoir 18 and pump 22. Valve assembly conduit 35 of supply static valve assembly 31 connects supply fluid reservoir conduit 34 to valve assembly outflow conduit 36. Pump 22 is configured to pump fluid in valve assembly outflow conduit 36 in the direction that is indicated by flow arrow 38. For example, valve assembly outflow conduit 36 may connect to and conduct a flow of fluid toward a microfluidic chip or another destination within a serviceable microgravity fluid-handling system. The terms "upstream" and "downstream" with reference to FIG. 2 are used with reference the flow direction that is indicated by flow arrow 38.

Figure 3:
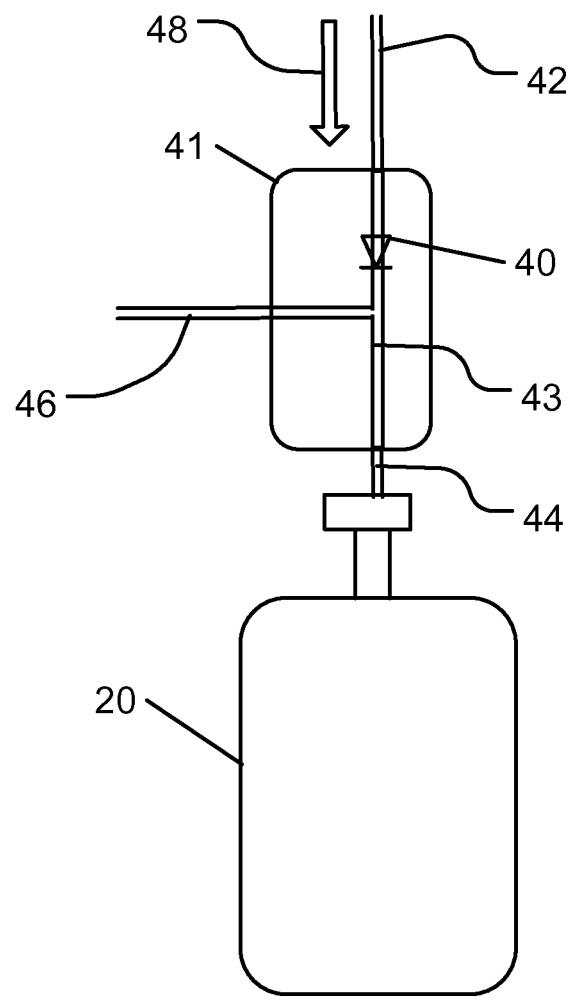
FIG. 3 schematically illustrates a configuration of a static valve assembly for connection to a fluid collection reservoir of a serviceable microgravity fluid-handing system, in accordance with an embodiment of the present invention.
Figure 4:
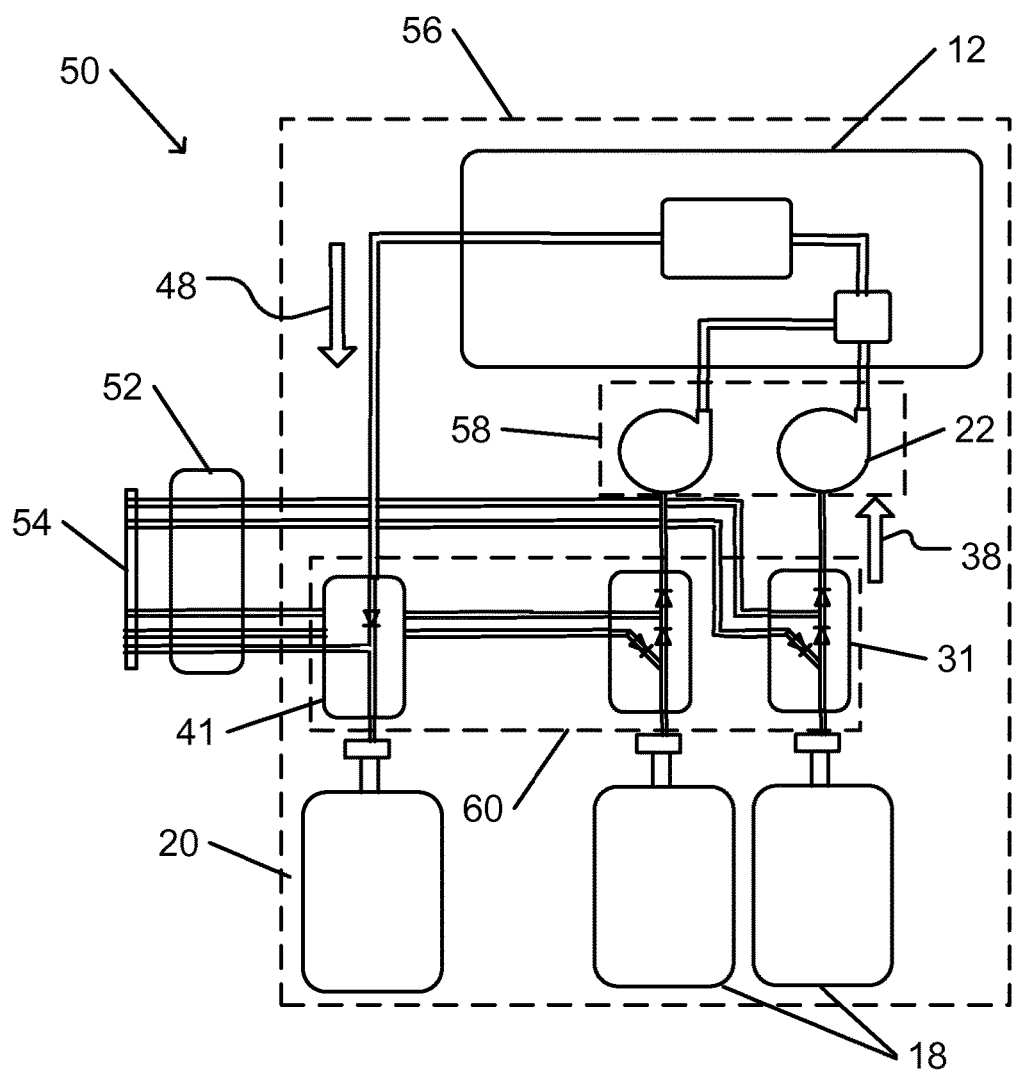
FIG. 4 schematically illustrates a serviceable microgravity fluid-handling system that incorporates a static valve assembly in accordance with an embodiment of the present invention.

Check valves 30a-30b of supply static valve assembly 31 are arranged to individually enable each of several operations. The operations may be part of a process that is performed on a microfluidic chip or elsewhere within a fluid-handling system, or may perform one or more maintenance functions with the fluid-handling system. As shown in FIGS. 2-4, a direction of forward (enabled) flow through a conduit with a check valve, such as any of check valves 30a-30b, is indicated by the direction of the triangular portion of the representation of the check valve.

In supply static valve assembly 31, check valve 30a on external filling conduit 32a is configured to allow inflow along external filling conduit 32a toward valve assembly conduit 35. Check valves 30b and 30c enable downstream flow along valve assembly conduit 35 from supply fluid reservoir conduit 34 to valve assembly outflow conduit 36. Check valve 30b is placed on valve assembly conduit 35 between the connection of external filling conduit 32a with valve assembly conduit 35 and the connection of external flushing conduit 32b with valve assembly conduit 35. Check valve 30c is placed on valve assembly conduit 35 downstream of the connection of external flushing conduit 32b with valve assembly conduit 35.

For example, supply static valve assembly 31 may enable filling of supply fluid reservoir 18 with a supply fluid, such as a liquid reagent or other supply fluid, from an external source. In some cases, filling may be performed prior to placement of the fluid-handling system into the microgravity environment (e.g., prior to launch of a spacecraft or takeoff of an aircraft).

The external source of the supply fluid may be connected to external filling conduit 32a. For example, the external source may include a tank, mains, or other source of a liquid. The flow of the supply fluid through external filling conduit 32a may be pressurized. For example, in a terrestrial environment, the flow may be pressurized by gravity (e.g., by at least part of the external source being at a greater elevation than external filling conduit 32a). The pressure may be provided by a piston or pump of, or that is associated with, the external source. When the supply fluid is forced into external filling conduit 32a, check valve 30a enables the fluid to flow from external filling conduit 32a into supply fluid reservoir conduit 34 and supply fluid reservoir 18.

Supply static valve assembly 31 may be configured to enable removal of air bubbles, gas pockets, or released gas from supply fluid reservoir 18. For example, external suction may be applied to external flushing conduit 32b. The external suction may be provided by a pump, an outwardly moving piston, an expanding bellows, or other source of suction. When the suction is applied to external flushing conduit 32b, external filling conduit 32a may be closed. The suction may pull a fluid (e.g., a gas, such as released or trapped air) from supply fluid reservoir 18 via supply fluid reservoir conduit 34. The fluid may flow through check valve 30a into external flushing conduit 32b. The applied suction may then remove the fluid via external flushing conduit 32b. Check valve 30c prevents the suction from removing fluid from valve assembly outflow conduit 36 or other parts of the fluid-handling system (including from other supply fluid reservoirs 18 of the fluid-handling system). In some cases, continued application of the suction, or increasing the strength of the suction, may be utilized to drain the supply fluid from supply fluid reservoir 18.

Supply static valve assembly 31 may be configured to enable pumping of a liquid reagent or other supply fluid from supply fluid reservoir 18 to a microfluidic chip or other destination via valve assembly outflow conduit 36. For example, pump 22 may be operated while external flushing conduit 32b is closed. In this case, a supply fluid may flow from supply fluid reservoir 18 via supply fluid reservoir conduit 34 into supply static valve assembly 31. Within supply static valve assembly 31, the supply fluid may flow from supply fluid reservoir conduit 34 through check valves 30b and 30c to valve assembly outflow conduit 36. Check valve 30a, as well as suction from pump 22, may prevent outward flow of the supply fluid through external filling conduit 32a. Alternatively or in addition, external filling conduit 32a may be closed when supply static valve assembly 31 is operating in a configuration for pumping the supply fluid from supply fluid reservoir 18 to a destination via valve assembly outflow conduit 36.

Supply static valve assembly 31 may be configured to enable flushing of valve assembly outflow conduit 36, pump 22, and other downstream components of a fluid-handling system with a flushing fluid (e.g., a liquid that is capable of removing remnants of a supply fluid or other fluid). In some cases, flushing may be performed after removal of the fluid-handling system from the microgravity environment (e.g., after landing of a spacecraft or aircraft).

An external source of the flushing fluid may be connected to external flushing conduit 32b. For example, the external source may include a tank, mains, or other source of the flushing fluid. The flow of the flushing fluid through external flushing conduit 32b may be pressurized. For example, in a terrestrial environment, the flow may be pressurized by gravity (e.g., by at least part of the external source being at a greater elevation than external filling conduit 32a. The pressure may be provided by a piston or pump of, or that is associated with, the external source. When the flushing fluid is forced into external flushing conduit 32b, check valve 30c enables the fluid to flow from external flushing conduit 32b into valve assembly outflow conduit 36, pump 22, and to components downstream of pump 22 (e.g., up to, or including, a microfluidic chip or other destination). Check valve 30b prevents flow of the flushing fluid into supply fluid reservoir 18. Check valves 30b and 30a prevent outflow of the flushing fluid via external filling conduit 32a. Alternatively or in addition, external filling conduit 32a may be closed when flushing is performed.

Thus, supply static valve assembly 31 may enable individually at least the operations of: filling supply fluid reservoir 18, removing air bubbles or accumulated gasses (or other fluids) from supply fluid reservoir 18 and supply fluid reservoir conduit 34, transferring a supply fluid from supply fluid reservoir 18 to valve assembly outflow conduit 36 (and downstream components), and flushing valve assembly outflow conduit 36 and pump 22 (and downstream components). The function of supply static valve assembly 31 is determined by operation of pump 22, and by whether one or both of external conduits 32a and 32b is closed or open, and if open, whether that external filling conduit 32a or 32b is connected to a source of pressurized fluid, of suction, or neither.

In some cases, a variant of supply static valve assembly 31 may include one or more additional external conduits, check valves, or both. Such additional conduits and check valves may enable one or more additional operations (e.g., filling supply fluid reservoir 18 with a mixture of fluids, flushing a portion of the valve assembly, or another operation).

In some cases, the function of check valves 30a and 30b may be provided by a single combination valve.

Figure 2B:
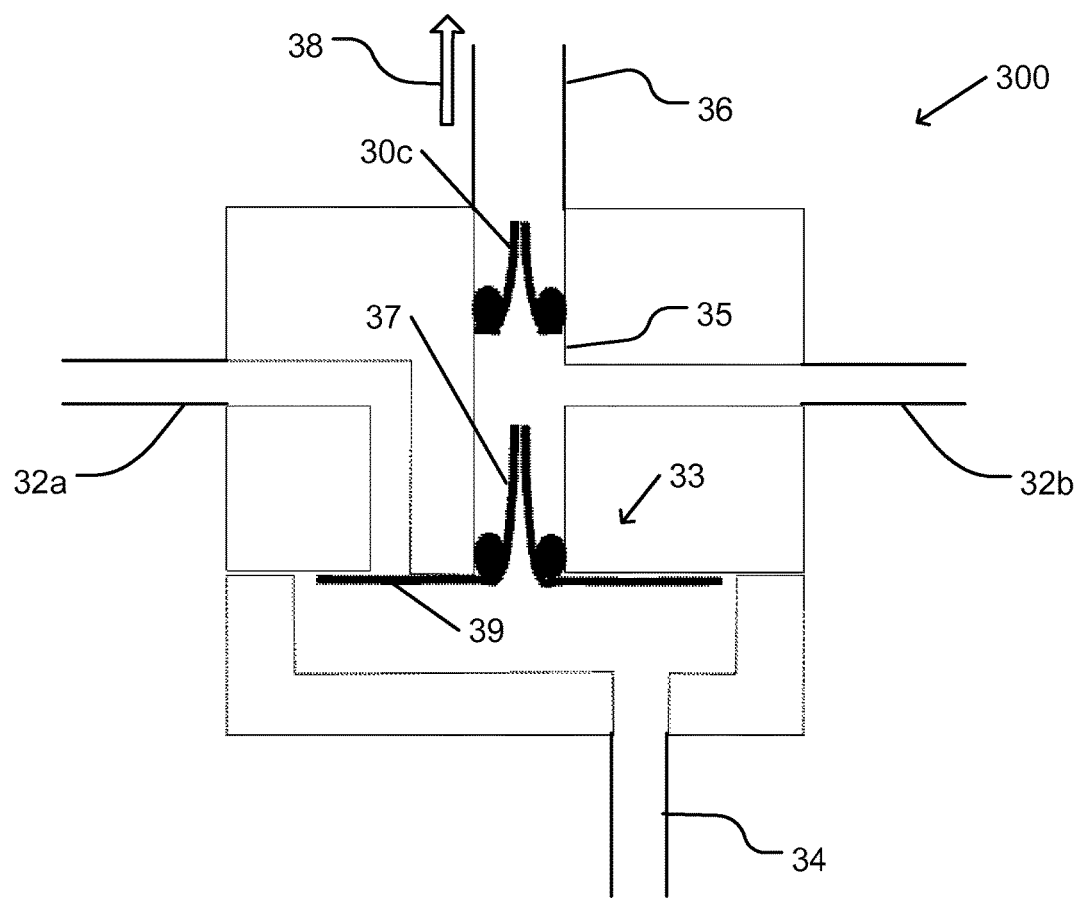
FIG. 2B schematically illustrated a variant of the static valve assembly shown in FIG. 2A that includes a combination valve.

FIG. 2B schematically illustrated a variant of the static valve assembly shown in FIG. 2A that includes a combination valve.

Supply static valve assembly 300 includes combination valve 33. Combination valve 33 includes lipped valve 37 (e.g., a duckbill valve) and flap valve 39. Alternatively or in addition, a combination valve may include another combination of valve types. Check valve 30c may include a duckbill valve or another type of valve.

Thus, lipped valve 37 functions in a manner similar to check valve 30b in FIG. 2A. Flap valve 39 functions in a manner similar to check valve 30a in FIG. 2A. Providing separate valves (e.g., lipped valve 37 and flap valve 39) as a single unit (combination valve 33) may simplify assembly of a microgravity fluid handling system.

In supply static valve assembly 300, flap valve 37 of combination valve 33 is configured to allow inflow along external filling conduit 32a toward supply fluid reservoir conduit 34. Sufficient pressure on external filling conduit 32a (and in supply fluid reservoir conduit 34) may enable fluid to flow through lipped valve 37 of combination valve 33 into valve assembly conduit 35. Flap valve 37 prevents backflow from supply fluid reservoir conduit 34 into external filling conduit 32a. Thus, supply static valve assembly 300 may enable filling of supply fluid reservoir 18 (FIG. 2A) with a supply fluid, such as a liquid reagent or other supply fluid, from an external source.

Application of suction to external flushing conduit 32b may enable removal of fluid (e.g., a gas, such as released or trapped air) from supply fluid reservoir conduit 34. Lipped valve 37 is configured to enable fluid from supply fluid reservoir conduit 34 to external flushing conduit 32b. Check valve 30c prevents the suction from removing fluid from valve assembly outflow conduit 36 or other parts of the fluid-handling system.

Supply static valve assembly 300 is configured to enable pumping of a liquid reagent or other supply fluid from supply fluid reservoir conduit 34 to valve assembly outflow conduit 36. For example, pump 22 (FIG. 2A) may be operated while external filling conduit 32a and external flushing conduit 32b are closed. Pumping may cause a supply fluid to flow from supply fluid reservoir conduit 34 via lipped valve 37 and check valve 30c to valve assembly outflow conduit 36. Flap valve 39 may prevent outward flow of the supply fluid through external filling conduit 32a. Alternatively or in addition, external filling conduit 32a may be closed when supply static valve assembly 300 is operating in a configuration for pumping the supply fluid from supply fluid reservoir conduit 34 to valve assembly outflow conduit 36.

Supply static valve assembly 300 may be configured to enable flushing of valve assembly outflow conduit 36 and other downstream components of a fluid-handling system with a flushing fluid. An external source of the flushing fluid may be connected to external flushing conduit 32b. The flow of the flushing fluid through external flushing conduit 32b may be pressurized. When the flushing fluid is forced into external flushing conduit 32b, check valve 30c enables the fluid to flow from external flushing conduit 32b into valve assembly outflow conduit 36. Lipped valve 37 prevents flow of the flushing fluid into supply fluid reservoir conduit 34. Lipped valve 37 and flap valve 39 prevent outflow of the flushing fluid via external filling conduit 32a. Alternatively or in addition, external filling conduit 32a may be closed when flushing is performed.

FIG. 3 schematically illustrates a configuration of a static valve assembly for connection to a fluid collection reservoir of a serviceable microgravity fluid-handing system, in accordance with an embodiment of the present invention.

Collection static valve assembly 41 is connected between collection inflow conduit 42 (e.g., through which a collected fluid flows from a microfluidic chip or from another source) and fluid collection reservoir 20. Valve assembly conduit 43 of collection static valve assembly 41 connects collection inflow conduit 42 to fluid collection reservoir conduit 44. For example, collection inflow conduit 42 may connect to and conduct a flow of fluid (e.g., a collected fluid) from a microfluidic chip or other source within a serviceable microgravity fluid-handling system toward fluid collection reservoir 20. The general direction of fluid flow is indicated by flow arrow 48. The direction of the flow may be determined by a pump 22 that is connected to a supply static valve assembly 31 (FIG. 2), or otherwise. The terms "upstream" and "downstream" with reference to FIG. 3 are used with reference the flow direction that is indicated by flow arrow 48.

Check valve 40 is placed on valve assembly conduit 43 upstream of the connection with external drainage conduit 46. Check valve 40 enables downstream flow along valve assembly conduit 43.

Check valve 40 of collection static valve assembly 41 is arranged to enable at least two operations. The operations may be related to a process that is performed on a microfluidic chip or elsewhere within a fluid-handling system, or may perform one or more maintenance functions with the fluid-handling system. In collection static valve assembly 41, check valve 40 enables downstream flow along valve assembly conduit 43 from collection inflow conduit 42 to fluid collection reservoir conduit 44.

For example, collection static valve assembly 41 may enable filling of fluid collection reservoir 20 with a collected fluid, such as a waste fluid or other process product, that flows out of a fluid processing unit (e.g., a microfluidic chip, or other unit), e.g., during operation of a process.

The fluid processing unit or other source of the collected fluid may be connected to collection inflow conduit 42. For example, when the collected fluid is to flow into fluid collection reservoir 20, external drainage conduit 46 may be closed. When the collected fluid is produced, check valve 40 enables the collected fluid to flow from collection inflow conduit 42 into fluid collection reservoir conduit 44 and fluid collection reservoir 20.

Collection static valve assembly 41 may be configured to enable emptying of fluid collection reservoir 20. For example, external suction may be applied to external drainage conduit 46. The external suction may be provided by a pump, an outwardly moving piston, an expanding bellows, or other source of suction. The suction may pull a collected fluid (e.g., a waste liquid) or other fluid from fluid collection reservoir 20 via fluid collection reservoir conduit 44. The fluid may flow into external drainage conduit 46, e.g., into a tank, pool, drain, or other repository that is connected to external drainage conduit 46. Fluid may similarly be removed from other upstream components of the fluid-handling system that are connected to collection inflow conduit 42, e.g., during flushing of the system.

For example, emptying fluid collection reservoir 20 or flushing the fluid-handling system may be performed after removal of the fluid-handling system from the microgravity environment (e.g., after landing of a spacecraft or aircraft).

Collection static valve assembly 41 may enable filling of fluid collection reservoir 20 with fluid, such as a cleaning solvent or fluid, or other fluid, from an external source. The external source of the supply fluid may be connected to external drainage conduit 46. For example, the external source may include a tank, mains, or other source of a liquid. The flow of the fluid through external drainage conduit 46 may be pressurized. For example, in a terrestrial environment, the flow may be pressurized by gravity (e.g., by at least part of the external source being at a greater elevation than external drainage conduit 46). The pressure may be provided by a piston or pump of, or that is associated with, the external source. When the fluid is forced into external drainage conduit 46, check valve 40 prevents the fluid from flowing from external drainage conduit 46 into collection inflow conduit 42 and upstream components of the fluid-handling system. The fluid may be removed from fluid collection reservoir 20 (e.g., after cleaning is complete) by application of suction to external drainage conduit 46, as described above.

Thus, collection static valve assembly 41 may enable at least the operations of: filling fluid collection reservoir 20 with a collected fluid from a component of the fluid-handling system (e.g., a microfluidic chip), filling fluid collection reservoir 20 with a fluid from an external source, and of removing fluid contents of fluid collection reservoir 20 or of upstream components of a fluid-handling system that are connected to collection inflow conduit 42 (e.g., draining fluid collection reservoir 20 or flushing the fluid-handling system. The function of collection static valve assembly 41 is determined by operation of a pump of the fluid-handling system (e.g., pump 22), and by whether external drainage conduit 46 is closed or open, and if open, whether external drainage conduit 46 is connected to a source of pressurized fluid, of suction, or neither.

In some cases, a variant of collection static valve assembly 41 may include one or more additional external conduits, check valves, or both. Such additional conduits and check valves may enable one or more additional operations (e.g., filling fluid collection reservoir 20 with a mixture of fluids, flushing a portion of the valve assembly, or another operation).

FIG. 4 schematically illustrates a serviceable microgravity fluid-handling system that incorporates a static valve assembly in accordance with an embodiment of the present invention.

Static valve fluid-handling system 50 is configured for operation in a microgravity environment. For example, components of static valve fluid-handling system 50 may be enclosed in system enclosure 56. System enclosure 56 may be configured for mounting or inclusion in a microgravity platform (e.g., payload, equipment rack, satellite or nanosatellite, or otherwise). For example, system enclosure 56 may be pressurized to enable proper operation of one or more components of static valve fluid-handling system 50.

Static valve fluid-handling system 50 may be assembled modularly. For example, fluid processing unit 12 (or another component in which a process takes place) may be mounted as a unit on an appropriate holder of system enclosure 56. Fluid processing unit 12 may include a power source when energy is required for a process (e.g., an endothermic, or an electrically or optically activated process) that takes place on fluid processing unit 12, or may be configured to draw power from another component of static valve fluid-handling system 50.

A pump assembly 58 with one or more pumps 22 may be mounted on a modular card, board, or other modular component that may be assembled into place on or in system enclosure 56. Pump assembly 58 may include a power source for operating pumps 22, or may draw power from another component of static valve fluid-handling system 50.

A static valve assembly unit 60 may also be mounted modularly within system enclosure 56, or may be mounted as separate static valve assemblies. For example, static valve assembly unit 60 may include one or more supply static valve assemblies 31 for extracting a supply fluid from one or more supply fluid reservoirs 18 (in the direction indicated by flow arrow 38). Static valve assembly unit 60 may include one or more collection static valve assemblies 41 for directing a collected fluid to one or more fluid collection reservoirs 20 (in the direction indicated by flow arrow 48).

Static valve fluid-handling system 50 may be accessed for servicing from outside of system enclosure 56 via external port assembly 54. External port assembly 54 includes one or more ports that enable access to one or more external conduits that connect to static valve assembly unit 60. For example, a source of (pressurized) fluid or suction may be connected to one or more ports of external port assembly 54. The configuration of connections to external port assembly 54 may enable individual performance of one or more service or maintenance functions. Such functions may include individually filling a fluid reservoir, removing air bubbles or otherwise trapped gasses from one or more components of static valve fluid-handling system 50, flushing one or more components of static valve fluid-handling system 50, or draining one or more fluid reservoirs of static valve fluid-handling system 50.

Conduit closing unit 52 is configured to enable closing of one or more external conduits that connect to external port assembly 54. Conduit closing unit 52 may be operated manually by a user or operator of static valve fluid-handling system 50. Alternatively or in addition, conduit closing unit 52 may be operated automatically, e.g., by a processor or other device that is configured to operate conduit closing unit 52. For example, when the conduits include flexible tubes, conduit closing unit 52 may be configured to crimp or pinch the tubes to prevent passage of fluid through the tube. Conduit closing unit 52 may be configured to selectively close individual external conduits, or groups of external conduits, to close all of the external conduits together, or may enable either one. For example, conduit closing unit 52 may be operated to close the external conduits prior to placement of static valve fluid-handling system 50 into the microgravity environment.

Figure 5:
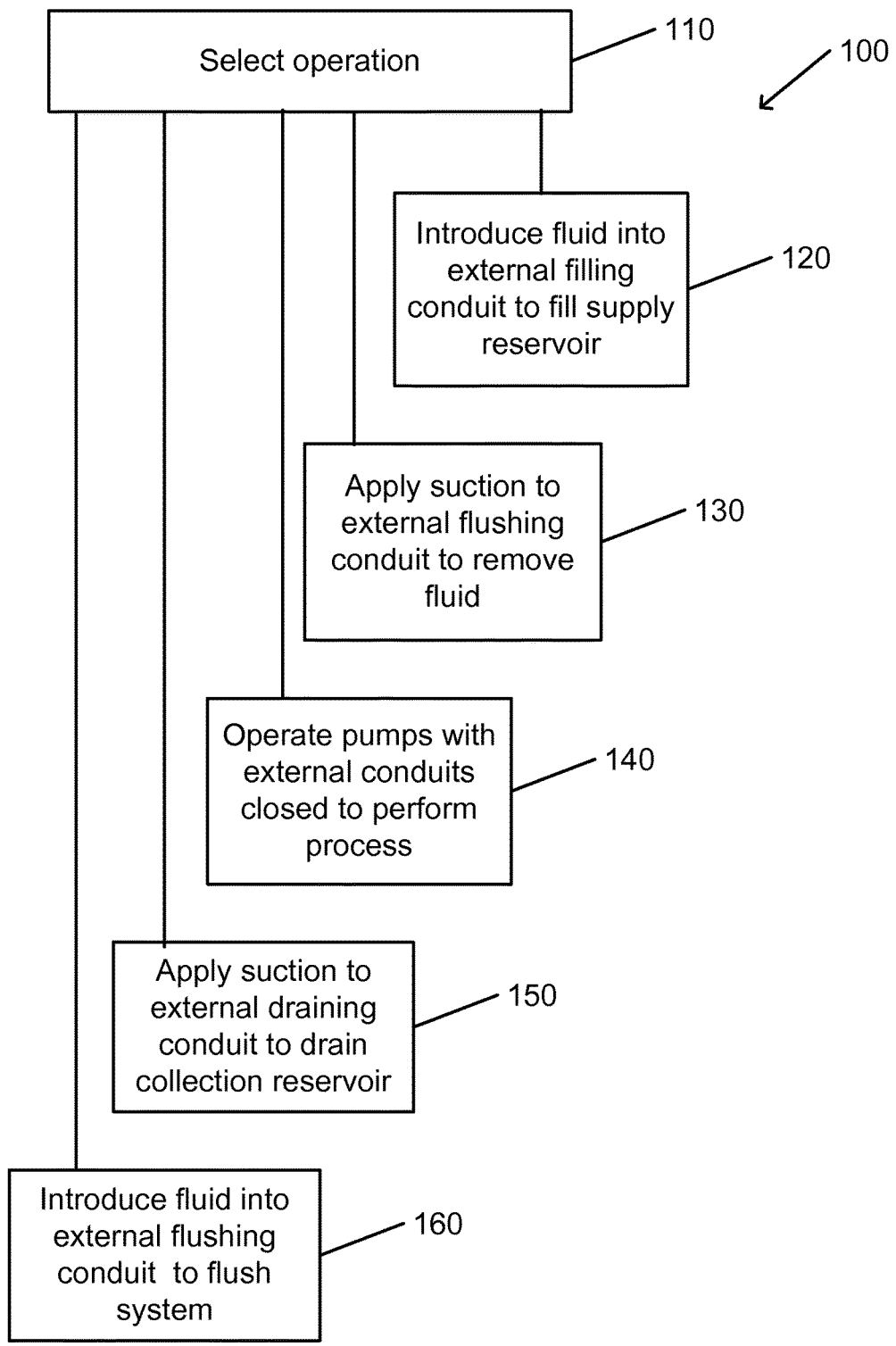
FIG. 5 is a flowchart depicting a method for operation of a serviceable microgravity fluid-handling system that incorporates a static valve assembly, in accordance with an embodiment of the present invention.

FIG. 5 is a flowchart depicting a method for operation of a serviceable microgravity fluid-handling system that incorporates a static valve assembly, in accordance with an embodiment of the present invention. Reference is also made to components that are shown in FIGS. 2-4.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Operations of static valve fluid system operation method 100 may be executed by an operator or user of a serviceable microgravity fluid-handling system with static valve assemblies, such as static valve fluid-handling system 50. Alternatively or in addition, some or all operations or static valve fluid system operation method 100 may be executed by an automatic controller that is configured to control or operate some or all components of static valve fluid-handling system 50.

A servicing, maintenance, or processing operation that is to be performed individually on static valve fluid-handling system 50 may be selected (block 110).

If a supply fluid reservoir 18 is to be filled, pressurized fluid may be introduced into a port of external filling conduit 32*a* of that supply fluid reservoir 18 (block 120).

If a gaseous fluid, such as air bubbles or trapped gas, is to be removed from a supply fluid reservoir 18, supply fluid reservoir conduit 34, or from valve assembly conduit 35, suction may be applied to external flushing conduit 32*b* of that supply fluid reservoir 18 (block 130). Similarly, application of the suction may remove another fluid, such as a supply fluid or a cleaning fluid, from supply fluid reservoir 18, from supply fluid reservoir conduit 34, or from valve assembly conduit 35.

When static valve fluid-handling system 50 is to perform a process in fluid processing unit 12, pumps 22 may be operated while all external conduits may be closed by conduit closing unit 52 (block 140). While the process is being performed, a supply fluid may be caused to flow from one or more supply fluid reservoirs 18 to a fluid processing unit 12. A collected fluid may flow from a fluid processing unit 12 to fluid collection reservoir 20.

When fluid collection reservoir 20 is to be drained, suction may be applied to external drainage conduit 46 (block 150).

When static valve fluid-handling system 50 is to be flushed, a flushing fluid may be introduced into a port of one or more external flushing conduits 32*b* (block 160). The flushing fluid may be caused to flow via the external flushing conduits 32*b*, via one or more pumps 22, and via fluid processing unit 12 to external drainage conduit 46. For example, the flushing fluid may be pressurized, suction may be applied to external drainage conduit 46, a pump 22 may be operated, or a combination of two or more of the above may cause the flushing fluid to flush static valve fluid-handling system 50.

In accordance with an embodiment of the present invention, a valve assembly (e.g., such as one or more supply valve assemblies and collection valve assemblies) of a fluid-handling system may include an externally controllable static valve assembly.

FIG. 6A schematically illustrates an externally controllable valve assembly of a serviceable microgravity fluid-handing system in a configuration that connects a fluid reservoir to an external conduit, in accordance with an embodiment of the present invention.

Externally controllable valve assembly 71 includes an externally controllable valve 70 that is connected to reservoir conduit 76, system conduit 78, and external conduit 80.

Reservoir conduit 76 connects externally controllable valve 70 to fluid reservoir 74. Fluid reservoir 74 may represent a supply fluid reservoir 18 (FIG. 1), a fluid collection reservoir 20, or another reservoir of a serviceable microgravity fluid-handing system. System conduit 78 connects externally controllable valve 70 to one or more other components of a serviceable microgravity fluid-handing system. For example, system conduit 78 may connect to one or more of a pump 22, a fluid processing unit 12, or another component of the serviceable microgravity fluid-handing system. External conduit 80 connects externally controllable valve 70 to an externally accessible port, such as, or similar to, a port of external port assembly 54 (FIG. 4). For example, the externally accessible port may be closed, may be connected to a source of a fluid, to a source of suction, or to another external apparatus. Thus external conduit 80 may function as one or more of a filling conduit (such as external filling conduit 32*a* in FIG. 2), a flushing conduit (such as external flushing conduit 32*b*), or a drainage conduit (such as external drainage conduit 46 in FIG. 3).

A configuration of externally controllable valve 70 (here schematically illustrated by the orientation of the T-joint that is shown within externally controllable valve 70) may be controlled by external controller 82. External controller 82 is accessible to, and may be controlled by, an operator (e.g., a human operator or an automatically operated mechanical or electronic device) that is located outside of the serviceable microgravity fluid-handing system. For example, control cable 84 may include an internal section that connects externally controllable valve 70 to a control port. For example, the control port may be located on a case or housing of the serviceable microgravity fluid-handing system, such as system enclosure 56 (FIG. 4). Control cable 84 may include an external section that connects to external controller 82 and which may be plugged into the port.

Externally controllable valve 70 may include a mechanism for changing and maintaining a configuration of externally controllable valve 70. For example, the mechanism may include an electric motor. In this case, control cable 84 may represent an electrical or optical cable, a wireless connection, or another suitable connection. The mechanism may include a hydraulic mechanism (e.g., with control cable 84 representing a hydraulic or pneumatic tube), a mechanical mechanism (e.g., with control cable 84 representing a Bowden cable or mechanical connection to external controller 82), or another suitable mechanism.

As shown in FIG. 6A, externally controllable valve 70 of externally controllable valve assembly 71 is in valve configuration 72*a*.

When externally controllable valve 70 is in valve configuration 72*a*, flow is enabled between external conduit 80 and reservoir conduit 76. Externally controllable valve 70 may be placed in valve configuration 72*a* in order to enable filling or emptying of fluid reservoir 74. For example, a fluid source may be connected to external conduit 80. The fluid may then fill fluid reservoir 74. For example, a supply fluid reservoir may be filled with a supply fluid, a supply fluid or fluid collection reservoir may be filled with a cleansing fluid, or with another fluid for use in operation, servicing, or maintenance of the serviceable microgravity fluid-handing system. A suction source may be applied to external conduit 80. The applied suction may remove a fluid from fluid reservoir 74 and from reservoir conduit 76. For example, the applied suction may empty fluid reservoir 74 of a fluid (e.g., excessive or remaining supply fluid, a collected product or waste fluid, a cleansing fluid, or another fluid), may remove air bubbles or trapped gas from fluid reservoir 74 or reservoir conduit 76, or may otherwise draw fluid out of fluid reservoir 74 or reservoir conduit 76.

The operations enabled by valve configuration 72a may be performed concurrently on all externally controllable valve assemblies 71 of the serviceable microgravity fluid-handing system. Alternatively or in addition, the operations enabled by valve configuration 72a may be performed individually or in groups of two or more on selected externally controllable valve assemblies 71 of the serviceable microgravity fluid-handing system.

FIG. 6B schematically illustrates the externally controllable valve assembly of FIG. 6A in a configuration that connects the fluid reservoir to another component of the serviceable microgravity fluid-handing system.

As shown in FIG. 6B, externally controllable valve 70 of externally controllable valve assembly 71 is in valve configuration 72b.

When externally controllable valve 70 is in valve configuration 72b, flow is enabled between reservoir conduit 76 and system conduit 78. Externally controllable valve 70 may be placed in valve configuration 72b in order to enable operation of a process in the serviceable microgravity fluid-handing system. For example, a pump that is connected to system conduit 78 may impel a supply fluid from fluid reservoir 74 (e.g., a supply fluid reservoir) to a microfluidic chip. In the microfluidic chip, supply fluids from two or more supply fluid reservoirs may interact to produce a collected fluid. The collected fluid may flow from the microfluidic chip via system conduit 78 of another externally controllable valve assembly 71 to fluid reservoir 74 (e.g., a fluid collection reservoir) of that other externally controllable valve assembly 71.

Typically, when a serviceable microgravity fluid-handing system is operating to perform a process, e.g., in a microfluidic chip, all externally controllable valves 70 connect to all fluid reservoirs 74 that participate in the process are placed in valve configuration 72b.

FIG. 6C schematically illustrates the externally controllable valve assembly of FIG. 6A in a configuration that connects a component of the serviceable microgravity fluid-handing system to an external conduit.

As shown in FIG. 6C, externally controllable valve 70 of externally controllable valve assembly 71 is in valve configuration 72c.

When externally controllable valve 70 is in valve configuration 72c, flow is enabled between external conduit 80 and system conduit 78. Externally controllable valve 70 may be placed in valve configuration 72a in order to enable filling one or more components of the serviceable microgravity fluid-handing system (such as a pump or microfluidic chip) with a fluid, or draining a fluid from the components (while bypassing fluid reservoir 74). For example, a pressurized fluid source, e.g., providing a cleaning solvent or other fluid, may be connected to external conduit 80 of one externally controllable valve assembly 71, and a suction source may be applied to an external conduit 80 of another externally controllable valve assembly 71. Alternatively, a source of fluid at ambient pressure may be connected to external conduit 80 of one externally controllable valve assembly 71, and a suction source may be applied to an external conduit 80 of the other externally controllable valve assembly 71. Alternatively, a source of pressurized fluid may be connected to external conduit 80 of one externally controllable valve assembly 71, and an external conduit 80 of the other externally controllable valve assembly 71 may be drained at ambient pressure. The fluid may be then flow through components of the serviceable microgravity fluid-handing system that are connected to system conduit 78 and drain out via external conduit 80 of the other externally controllable valve assembly 71. In this manner, the serviceable microgravity fluid-handing system may be flushed, e.g., to remove remnants of one or more materials from within conduits or components of the serviceable microgravity fluid-handing system.

The operations enabled by valve configuration 72c may be performed individually concurrently on all externally controllable valve assemblies 71 of the serviceable microgravity fluid-handing system. Alternatively or in addition, the operations enabled by valve configuration 72c may be performed in groups of two or more on selected externally controllable valve assemblies 71 of the serviceable microgravity fluid-handing system.

Figure 7:
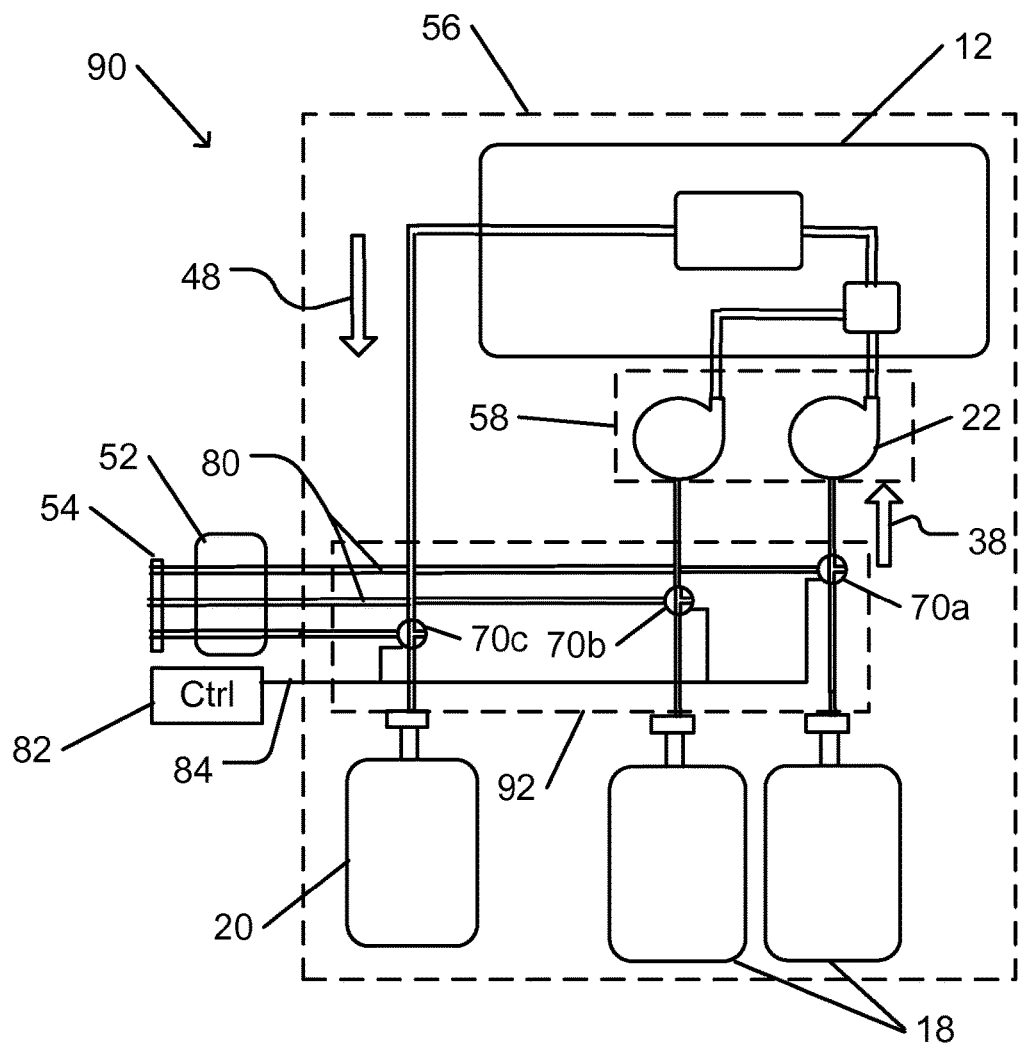
FIG. 7 schematically illustrates a serviceable microgravity fluid-handling system that incorporates an externally controllable valve assembly in accordance with an embodiment of the present invention.

FIG. 7 schematically illustrates a serviceable microgravity fluid-handling system that incorporates an externally controllable valve assembly in accordance with an embodiment of the present invention.

Externally controllable valve fluid-handling system 90 is configured for operation in a microgravity environment. For example, components of externally controllable valve fluid-handling system 90 may be enclosed in system enclosure 56. System enclosure 56 may be configured for mounting or inclusion in a microgravity platform (e.g., payload, equipment rack, satellite or nano-satellite, or otherwise). For example, system enclosure 56 may be pressurized to enable proper operation of one or more components of externally controllable valve fluid-handling system 90.

Externally controllable valve fluid-handling system 90 may be assembled modularly. For example, fluid processing unit 12 (e.g., a microfluidic chip or another component in which a process takes place) may be mounted as a unit on an appropriate holder of system enclosure 56. A pump assembly 58 with one or more pumps 22 may be mounted on a modular card, board, or other modular component that may be assembled into place on or in system enclosure 56.

Externally controllable valve assembly 92 may also be mounted modularly within system enclosure 56, or may be mounted as separate valve assemblies. For example, externally controllable valve assembly 92 may include one or more externally controllable valves 70a and 70b connected to one or more supply fluid reservoirs 18. Externally controllable valve assembly 92 may include one or more externally controllable valves 70c connected to one or more collection static valve assemblies 41.

Static valve fluid-handling system 50 may be accessed for servicing from outside of system enclosure 56 via external port assembly 54. External port assembly 54 includes one or more ports that enable access to one or more external conduits that connect to externally controllable valve assembly 92. For example, a source of (pressurized) fluid or suction may be applied to one or more ports of external port assembly 54. The configuration of connections to external port assembly 54 may enable performance of one or more service or maintenance functions. Such functions may include filling a fluid reservoir, removing air bubbles or otherwise trapped gasses from one or more components of externally controllable valve fluid-handling system 90, flushing one or more components of externally controllable valve fluid-handling system 90, or draining one or more fluid reservoirs of externally controllable valve fluid-handling system 90. Conduit closing unit 52 is configured to enable closing of one or more external conduits that connect to external port assembly 54.

One or more externally controllable valves 70a-70c may be controlled by external controller 82 via control cable 84. As shown, externally controllable valves 70a-70c are all in valve configuration 72b (FIG. 6B) to enable a process in fluid processing unit 12. In the process, a supply fluid is extracted by pumps 22 from supply fluid reservoirs 18 via externally controllable valves 70a-70b and conducted to fluid processing unit 12. A collected fluid (e.g., waste fluid) that is produced in fluid processing unit 12 is conducted to fluid collection reservoir 20 via externally controllable valve 70c.

External controller 82 may be operated to change a configuration of one or more of externally controllable valves 70a-70c. Changing the configuration while connecting a fluid or suction source to one or more ports of external port assembly 54 and operating conduit closing unit 52 to open one or more external conduits may enable servicing or maintenance of part or all of externally controllable valve fluid-handling system 90.

For example, one or more of externally controllable valves 70a-70c may be placed in valve configuration 72a (FIG. 6A). For example, placement in valve confirmation 72a while opening the corresponding conduit in conduit closing unit 52 may enable filling a supply fluid reservoir 18 via external port assembly 54 (by connection to a fluid source) and externally controllable valve 70a or 70b. Placement in valve confirmation 72a while opening the corresponding conduit in conduit closing unit 52 may also enable emptying a supply fluid reservoir 18 or fluid collection reservoir 20 via external port assembly 54 (by connection to a suction source).

Two or more of externally controllable valves 70a-70c may be placed in valve configuration 72c (FIG. 6C). For example, placement in valve confirmation 72c while opening the corresponding conduits in conduit closing unit 52 may enable flushing all or part of externally controllable valve fluid-handling system 90. For example, one or more of the conduits may be connected to a source of a flushing fluid while another one or more of the conduits may be connected to a suction source. The flushing fluid may flow via one or more pumps 22 and fluid processing unit 12 to the conduit that is connected to the suction source.

Figure 8:
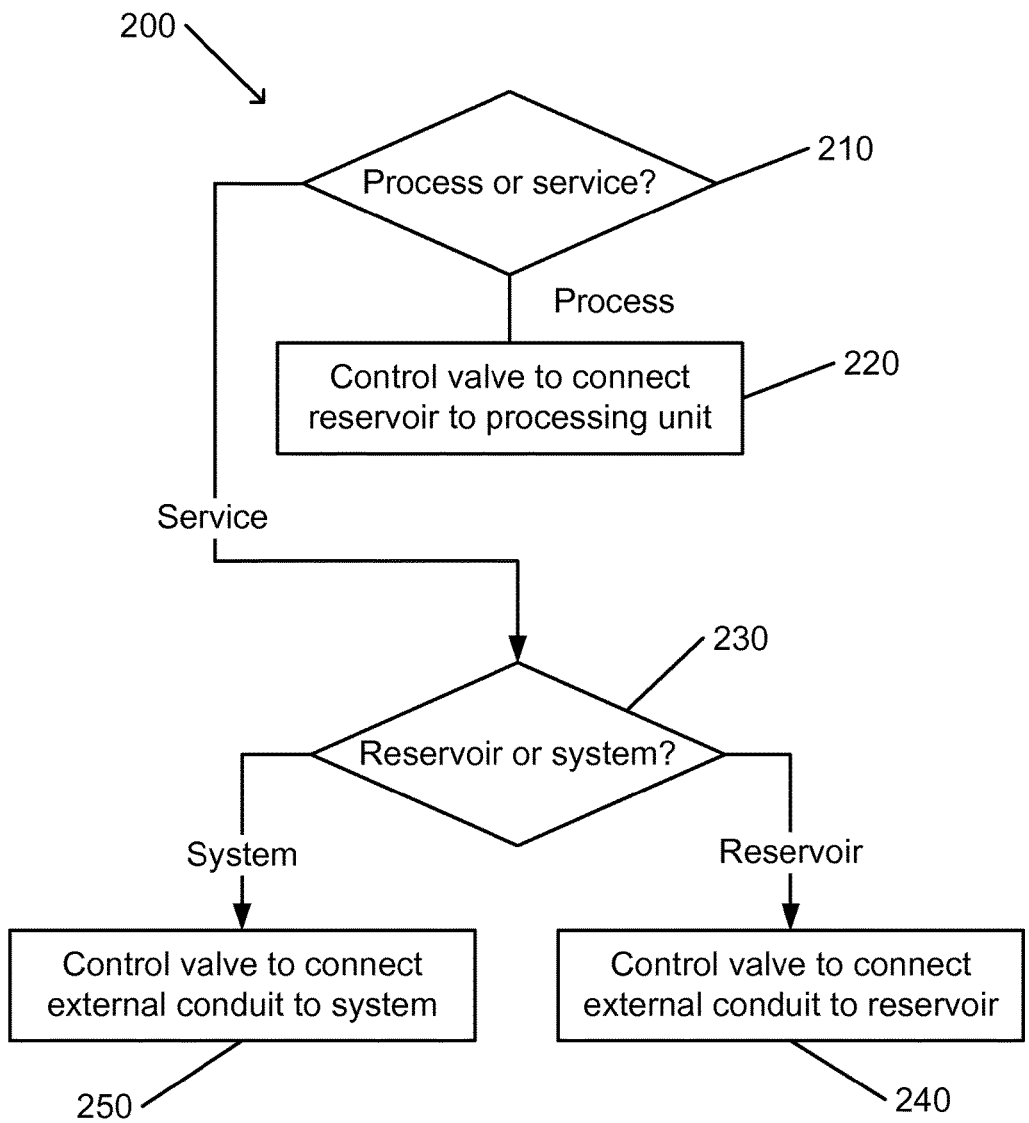
FIG. 8 is a flowchart depicting a method for operation of a serviceable microgravity fluid-handling system that incorporates an externally controllable valve assembly, in accordance with an embodiment of the present invention.

FIG. 8 is a flowchart depicting a method for control of an externally controllable valve assembly of a serviceable microgravity fluid-handling system, in accordance with an embodiment of the present invention. Reference is also made to components that are shown in FIGS. 6A-6C and 7.

Operations of externally controllable valve operation method 200 may be executed by an operator or user of a serviceable microgravity fluid-handling system with externally controllable valve assemblies, such as externally controllable valve fluid-handling system 90. Alternatively or in addition, externally controllable valve operation method 200 may be executed by an automatic controller that is configured to control or operate some or all of externally controllable valve assembly 92 of externally controllable valve fluid-handling system 90.

Externally controllable valve assembly 92 may be operated to individually enable a process to be performed by externally controllable valve fluid-handling system 90, or to enable servicing of externally controllable valve fluid-handling system 90 (block 210).

When a process is to be performed, externally controllable valve assembly 92 may be controlled to connect one or more reservoirs (e.g., at least one supply fluid reservoir 18 and one fluid collection reservoir 20) to fluid processing unit 12 of externally controllable valve fluid-handling system 90 (block 220). For example, one or more externally controllable valves 70 may be placed in valve configuration 72b.

When externally controllable valves 70 are placed in valve configuration 72b, conduit closing unit 52 may be operated to close external conduits 80. One or more pumps 22 may be operated to cause the supply fluid to flow from supply fluid reservoir 18 to fluid processing unit 12.

Externally controllable valve assembly 92 may be operated to enable individual servicing of either a fluid reservoir 74 (e.g., supply fluid reservoir 18 or fluid collection reservoir 20) of externally controllable valve fluid-handling system 90, or other components (e.g., one or more of one or more pumps 22 or fluid processing unit 12) of externally controllable valve fluid-handling system 90 (block 230).

In order for a fluid reservoir 74 to be serviced, externally controllable valve assembly 92 may be controlled to connect one or more fluid reservoirs 74 (e.g., supply fluid reservoirs 18 or fluid collection reservoir 20) to its corresponding external conduit 80 (block 240). Thus, the corresponding externally controllable valve 70 is placed in valve configuration 72a.

For example, if a fluid reservoir 74 is to be filled (e.g., with a supply fluid or cleaning fluid), pressurized fluid may be introduced into a port of external conduit 80 of that reservoir. If air bubbles or trapped gas is to be removed from a fluid reservoir 74 or reservoir conduit 76, suction may be applied to the external conduit 80 of that fluid reservoir 74. If a fluid reservoir 74 (e.g., fluid collection reservoir 20) is to be drained, suction may be applied to external conduit 80 of that fluid reservoir 74.

In order to service other components (other than a fluid reservoir 74) of externally controllable valve fluid-handling system 90, externally controllable valve assembly 92 may be controlled to connect one or more external conduits 80 to its corresponding system conduit 78 (block 250). Thus, the corresponding externally controllable valve 70 is placed in valve configuration 72c.

For example, components of externally controllable valve fluid-handling system 90 (e.g., pumps 22 and fluid processing unit 12) may be flushed with a flushing fluid. The flushing fluid may be caused to flow via an external conduit 80, via one or more pumps 22 and via fluid processing unit 12, to another external conduit 80. For example, the flushing fluid may be pressurized, suction may be applied to the other external conduit 80, a pump 22 may be operated, or a combination of two or more of the above may cause the flushing fluid to flush externally controllable valve fluid-handling system 90.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A serviceable system for handling fluids in microgravity, the system comprising:
   one or a plurality of supply reservoirs, each of said one or a plurality of supply reservoirs configured to hold a supply fluid for a process;
   a fluid processing unit configured to perform the process;
   a collection reservoir configured to collect a fluid from the fluid processing unit;
   for each of said one or a plurality of supply reservoirs:
      a supply valve assembly of one or a plurality of valves and conduits; and
      at least one external conduit, at least one conduit of said at least one external conduit being connectable to an external fluid source, and at least one conduit of said at least one external conduit being connectable to an external suction source,
      wherein the supply valve assembly is configured to enable individually: flow of the supply fluid from that supply reservoir to the fluid processing unit, flow of fluid into that supply reservoir from a conduit of said at least one external conduit; withdrawal of fluid from that supply reservoir to a conduit of said at least one external conduit, and flow of fluid from a conduit of said at least one external conduit to the fluid processing unit.

2. The system of claim 1, wherein said one or a plurality of valves comprises a first, second and third check valve, and wherein said at least one external conduit comprises:
   a filling conduit that is connectable to the external fluid source, the filling conduit connected to said that supply reservoir via the first check valve, the first check valve configured to enable fluid flow from the filling conduit to said that supply reservoir; and
   a flushing conduit that is connectable to the external suction source, the flushing conduit being connected to said that supply reservoir via the second check valve, the second check valve configured to enable the external suction source to cause a flow of fluid from said that supply reservoir to the flushing conduit, the flushing unit being further connectable to an external source of a flushing fluid, the third check valve being configured to enable flow of the flushing fluid from the flushing conduit to the fluid processing unit.

3. The system of claim 2, wherein the first and second valves comprise a combination valve that is configured to enable the flow from the filling conduit to said that supply reservoir and to enable the flow from said that supply reservoir to the fluid processing unit while concurrently blocking flow from said that supply reservoir to the filling conduit.

4. The system of claim 2, wherein the first, second or third check valve comprises a duckbill valve.

5. The system of claim 1, wherein said one or a plurality of valves comprises an externally controllable valve, and wherein said at least one external conduit comprises one external conduit that is connectable to the external fluid source or to the external suction source.

6. The system of claim 5, wherein the externally controllable valve comprises a three-way valve, the three-way valve controllable to connect any two of the external conduit, said that supply reservoir and the fluid processing unit.

7. The system of claim 5, further comprising a controller to control operation of the externally controllable valve.

8. The system of claim 1, wherein the collection reservoir is provided with a collection valve assembly and a drainage conduit, the collection valve assembly configured to enable a flow of a fluid from the fluid processing unit to the collection reservoir, and a fluid flow between the collection reservoir and the drainage conduit.

9. The system of claim 8, wherein the collection valve assembly comprises a check valve configured to enable fluid flow from the fluid processing unit to the collection reservoir.

10. The system of claim 1, further comprising a pump configured to cause the supply fluid to flow from said one or a plurality of supply reservoirs to the fluid processing unit.

11. The system of claim 1, further comprising a conduit closing unit to enable opening or closing one or more of said at least one external conduit.

12. The system of claim 1, wherein the fluid processing unit comprises a microfluidic chip.

13. A method for operating a serviceable system for handling fluids in microgravity, the system including one or a plurality of supply reservoirs, a fluid processing unit, a collection reservoir, and at least one external conduit, the method comprising for each of said one or a plurality of supply reservoirs:
   operating a valve assembly of that supply reservoir so as to individually enable fluid to flow between a conduit of said at least one external conduit and that supply reservoir, between that supply reservoir and the fluid processing unit, or between a conduit of said at least one external conduit and the fluid processing unit.

14. The method of claim 13, further comprising operating a pump to cause fluid to flow from said that supply reservoir to the fluid processing unit.

15. The method of claim 13, further comprising operating a collection valve assembly of the collection reservoir to enable fluid to flow from the fluid processing unit to the collection reservoir or to enable fluid to flow from the collection reservoir to an external drainage conduit.

16. The method of claim 13, wherein the valve assembly comprises a static valve assembly, and wherein operating the valve assembly comprises operating a pump, introducing fluid into said at least one external conduit or applying suction said at least one external conduit.

17. The method of claim 16, wherein said at least one external conduit comprises a filling conduit and a flushing conduit, and wherein operating the valve assembly comprises one of individually:
   operating a pump to cause fluid to flow from said that supply reservoir to the fluid processing unit;
   introducing fluid into the filling conduit to fill said that supply reservoir;
   applying suction to the flushing conduit to remove a fluid from said that supply reservoir; and introducing a flushing fluid into the flushing conduit to cause the flushing fluid to flow from the flushing conduit to the fluid processing unit.

18. The method of claim 13, wherein the valve assembly comprises an externally operable valve, and wherein operating the valve assembly comprises operating a controller to operate the externally operable valve.

19. The method of claim 18, wherein the externally operable valve comprises a three-way valve and said at least one external conduit comprises a single external conduit, the three-way valve being operable to individually connect one of: the single external conduit with said that supply reservoir, said that supply reservoir with the fluid processing unit, or the single external conduit with the fluid processing unit.

20. The method of claim 19, further comprising:
- when the three-way valve connects said that supply reservoir with the fluid processing unit, operating a pump to cause fluid to flow from said that supply reservoir to the fluid processing unit;
- when the three-way valve connects the single external conduit with said that supply reservoir, introducing fluid into the single external conduit to fill said that supply reservoir;
- when the three-way valve connects the single external conduit with said that supply reservoir, applying suction to the single external conduit to remove a fluid from said that supply reservoir; or
- when the three-way valve connects the single external conduit with the fluid processing unit, introducing a flushing fluid into the single external conduit to cause the flushing fluid to flow from the single external conduit to the fluid processing unit.

* * * * *